United States Patent
Park

(10) Patent No.: US 7,768,572 B2
(45) Date of Patent: Aug. 3, 2010

(54) IRIS RECOGNITION CAMERA FOR AN IRIS RECOGNITION SYSTEM AND A METHOD OF OPERATION FOR AN IRIS RECOGNITION CAMERA

(75) Inventor: Se Woong Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1452 days.

(21) Appl. No.: 10/747,945

(22) Filed: Dec. 31, 2003

(65) Prior Publication Data
US 2004/0160518 A1 Aug. 19, 2004

(30) Foreign Application Priority Data
Jan. 2, 2003 (KR) ............... 10-2003-0000034

(51) Int. Cl.
H04N 7/18 (2006.01)
H04N 5/262 (2006.01)
H04N 5/232 (2006.01)
G03B 13/00 (2006.01)
G06K 9/00 (2006.01)
G02B 27/02 (2006.01)

(52) U.S. Cl. ............ 348/350; 348/78; 348/240.3; 348/347; 382/115; 359/800

(58) Field of Classification Search ........... 348/77–78, 348/347, 162, 164, 240.99, 240.3, 335, 345, 348/348, 350, 357, 374; 382/115, 117; 359/798–800; 396/100
See application file for complete search history.

(56) References Cited

U.S. PATENT DOCUMENTS

| | | | | |
|---|---|---|---|---|
| 5,267,085 A | * | 11/1993 | Sasaki et al. | 359/694 |
| 5,353,163 A | * | 10/1994 | Shibayama et al. | 359/692 |
| 5,541,772 A | * | 7/1996 | Lin | 359/692 |
| 6,011,657 A | * | 1/2000 | Labaziewicz | 359/691 |
| 6,072,443 A | * | 6/2000 | Nasserbakht et al. | 345/7 |
| 6,160,583 A | * | 12/2000 | Kato et al. | 348/375 |
| 6,747,814 B2 | * | 6/2004 | Abe | 359/746 |
| 6,850,631 B1 | * | 2/2005 | Oda et al. | 382/117 |
| 6,930,707 B2 | * | 8/2005 | Bates et al. | 348/78 |
| 7,352,387 B2 | * | 4/2008 | Yamamoto | 348/63 |
| 2002/0135693 A1 | * | 9/2002 | Ohkawara et al. | 348/347 |
| 2002/0191076 A1 | * | 12/2002 | Wada et al. | 348/78 |

FOREIGN PATENT DOCUMENTS

CN 1328309 12/2001
EP 1 139 301 10/2001

OTHER PUBLICATIONS

Chinese Office Action dated Mar. 2, 2007.

* cited by examiner

Primary Examiner—Sinh Tran
Assistant Examiner—Daniel M Pasiewicz
(74) Attorney, Agent, or Firm—KED & Associates LLP

(57) ABSTRACT

An iris recognition camera is provided which includes a driving barrel configured to support a lens, a moving unit configured to reciprocatingly move the driving barrel to perform both focus and zoom operations, and a position sensor configured to detect a position of the driving barrel.

16 Claims, 7 Drawing Sheets

IRIS RECOGNITION CAMERA FOR AN IRIS RECOGNITION SYSTEM AND A METHOD OF OPERATION FOR AN IRIS RECOGNITION CAMERA

BACKGROUND OF THE INVENTION

1. Field of the Invention

The invention relates to an iris recognition camera for an iris recognition system and a method of operation for an iris recognition camera.

2. Background of the Related Art

In recent years, systems for validating personal identification have been widely used for security purposes. Such systems verify personal identification and allow a verified individual to enter into a restricted area or access to restricted information. Such systems, contact or non-contact type card systems, fingerprint recognition systems, and iris recognition systems are well known.

More particularly, iris recognition systems have been used more and more in recent years. With iris recognition systems, there is no need to possess personal information, storing means, or of contacting any portion of the user's body.

FIG. 1 shows a schematic diagram of a related art iris recognition system.

As shown in FIG. 1, when a user approaches the iris recognition system 10, a distance-measuring device 9, such as a sensor, measures a distance to the user. Then, the measured distance value is transmitted to a controller 5 through a driver 7 and the controller 5 determines if the measured distance value is within an operation range. When it is determined that the distance should be corrected, the user is notified. When it is determined that the distance is within the operation range, the controller 5 transmits a control signal to the driver 7 so that the system can prepare to scan an iris image.

In addition, the driver 7 transmits an active signal to a display 8 to let the user know operation of the system is about to begin. Then, when the user aligns his/her eye(s) with an optical axis of a camera 3 through an optical window 1, a cold mirror 2 allows an infrared ray to be transmitted from the user's eye to the camera while interrupting a visible ray. At this point, the system 10 displays a location of the user's iris so that the user can determine whether his/her eye(s) is located on the optical axis.

In addition, the controller 5 performs a zoom in/out and focusing control by calculating zoom and focus values based on the distance value transmitted from the distance-measuring sensor 9. Afterwards, the controller 5 adjusts an intensity of a lighting device 6 through the driver 7 in accordance with the measured distance value, and takes a photograph of the iris using the camera 3. The photographed iris image is signal-processed in response to an iris image analysis in a frame graver 4, and the controller 5 performs the recognition of the iris using the signal-processed iris image information.

In the above-described related art iris recognition system, the camera 3 performs a zoom in/out function, as well as a focusing function. That is, the iris recognition camera 3 is provided with a zoom lens system for performing the zoom in/out function and a focus lens system for performing the focusing operation. The zoom lens system and the focus lens system are independently operated and adjusted in their positions. Further, the zoom lens system and the focus lens system are reciprocally controlled by respective driving parts.

However, because of the independent operations of the respective zoom lens system and the focus lens system by the respective driving parts, the structure is complicated, which increases manufacturing costs.

In addition, since the zoom and focus functions are independently realized in sequence, a lot of time is required for the operation of the camera.

Meanwhile, other conventional art iris recognition systems have been designed such that zoom and focus operations are not performed in the camera, but rather the camera lets the user know a direction and distance the user has to move. However, in this case, since the user has to move upward and downward, rightward and leftward, and frontward and rearward by himself/herself to align his/her eye(s) with the optical axis, it is inconvenient for the user.

SUMMARY OF THE INVENTION

An object of the invention is to substantially solve at least one or more of the above problems and/or disadvantages in a whole or in part to provide at least the advantages described hereinafter.

In order to achieve at least the above objects, in a whole or in part, and in accordance with the purposes of the invention, as embodied and broadly described, there is provided an iris recognition camera comprising a driving barrel configured to support a lens, a moving unit configured to reciprocatingly move the driving barrel to perform both focus and zoom operations, and a position sensor configured to detect a position of the driving barrel.

To further achieve at least the above objects, in whole or in part, and in accordance with the purposes of the invention, as embodied and broadly described, there is provided an iris recognition camera comprising a step motor configured to provide an accurate rotating amount, a driving barrel configured to be reciprocated by a rotational force transmitted from the step motor; and a wide-angle lens positioned on the driving barrel and configured to allow a user's image to be captured by moving the driving barrel to an appropriate image pickup location for the user.

To further achieve at least the above objects, in whole or in part, and in accordance with the purposes of the invention, as embodied and broadly described, there is provided an iris recognition camera comprising a driving motor, a wide-angle lens configured to be reciprocated by power transmitted from the driving motor and having a focusing distance of about 11.8±1 mm, and an image pickup device configured to convert light refracted by the wide-angle lens into an image of a user's iris.

To further achieve at least the above objects, in whole or in part, and in accordance with the purposes of the invention, as embodied and broadly described, there is provided a method of operation for an iris recognition camera comprising detecting a user, moving a camera lens to an initial position detected by a position sensor after the position sensor detects the user, moving the camera lens to an image pickup location where a user's iris can be captured, and performing the image pickup using an image pickup device.

To further achieve at least the above objects, in whole or in part, and in accordance with the purposes of the invention, as embodied and broadly described, there is provided a method of operation for an iris recognition camera comprising turning on power of an iris recognition camera, moving a lens to an initial position, detecting a user, capturing an iris image of the user by moving the lens to a location where the iris image is focused, and storing a current location of the lens.

BRIEF DESCRIPTION OF THE DRAWINGS

The accompanying drawings, which are included to provide a further understanding of the present invention and are incorporated in and constitute a part of this application, illustrate embodiment(s) of the present invention and together with the description serve to explain the principle of the present invention. In the drawings.

DETAILED DESCRIPTION OF PREFERRED EMBODIMENTS

Reference will now be made in detail to embodiments of the invention with reference to the accompanying drawings, in which like reference numbers have been used to indicate like elements. The following embodiments are intended not to limit the scope of the claims. Many alternatives, modifications, and variations will be apparent to those skilled in the art.

The invention is based on the concept that the scanning location should be close to the iris recognition camera. For example, Applicants have determined that when a wide-angle lens is used in an iris recognition camera, zoom and focus functions can be simultaneously performed. That is, since a wide-angle lens has a short focus distance in comparison to a standard lens, an iris recognition camera having such a wide-angle lens can easily take a picture of a closely located object, in an enlarged size. Namely, conventional art iris recognition camera systems were designed to scan the iris when a user closely approaches the lens. In contrast, when a wide-angle lens is employed in an iris recognition system or camera, the structure can be simplified, while still scanning the user's iris with accuracy and high resolution.

Figure 1:
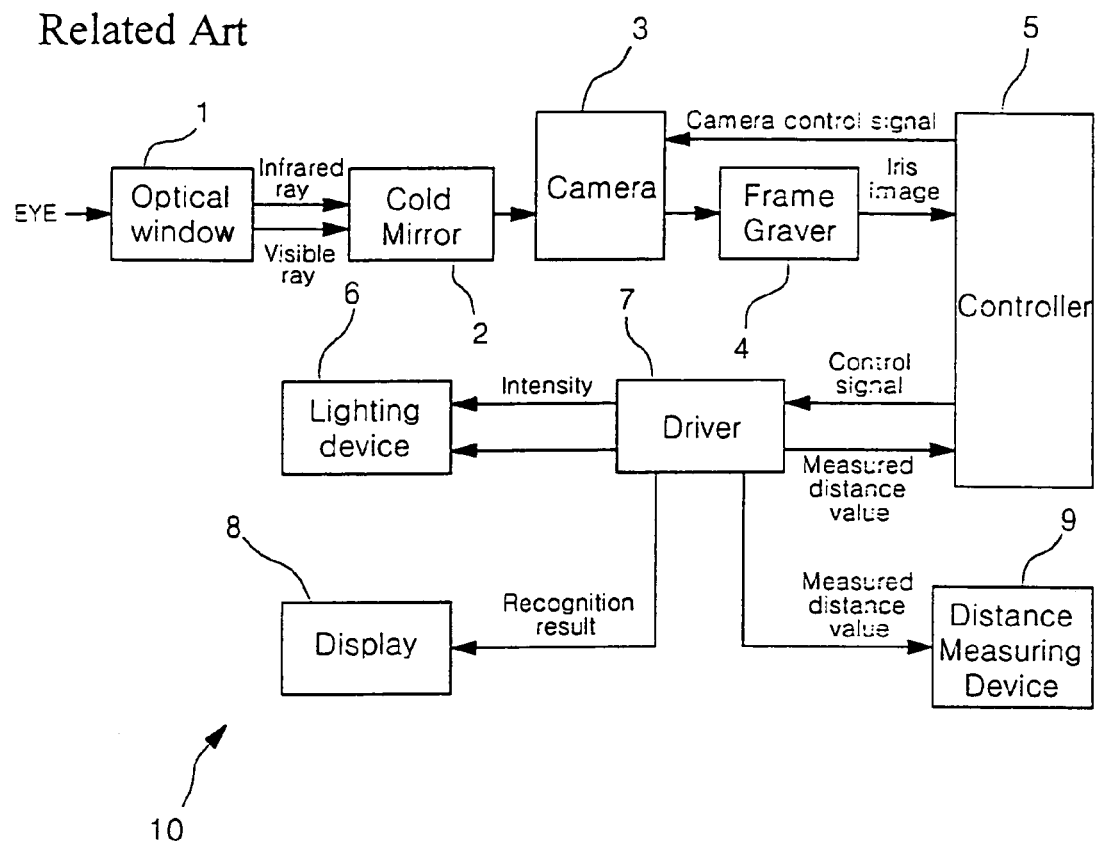
FIG. 1 is a schematic diagram of a related art iris recognition system.
Figure 2:
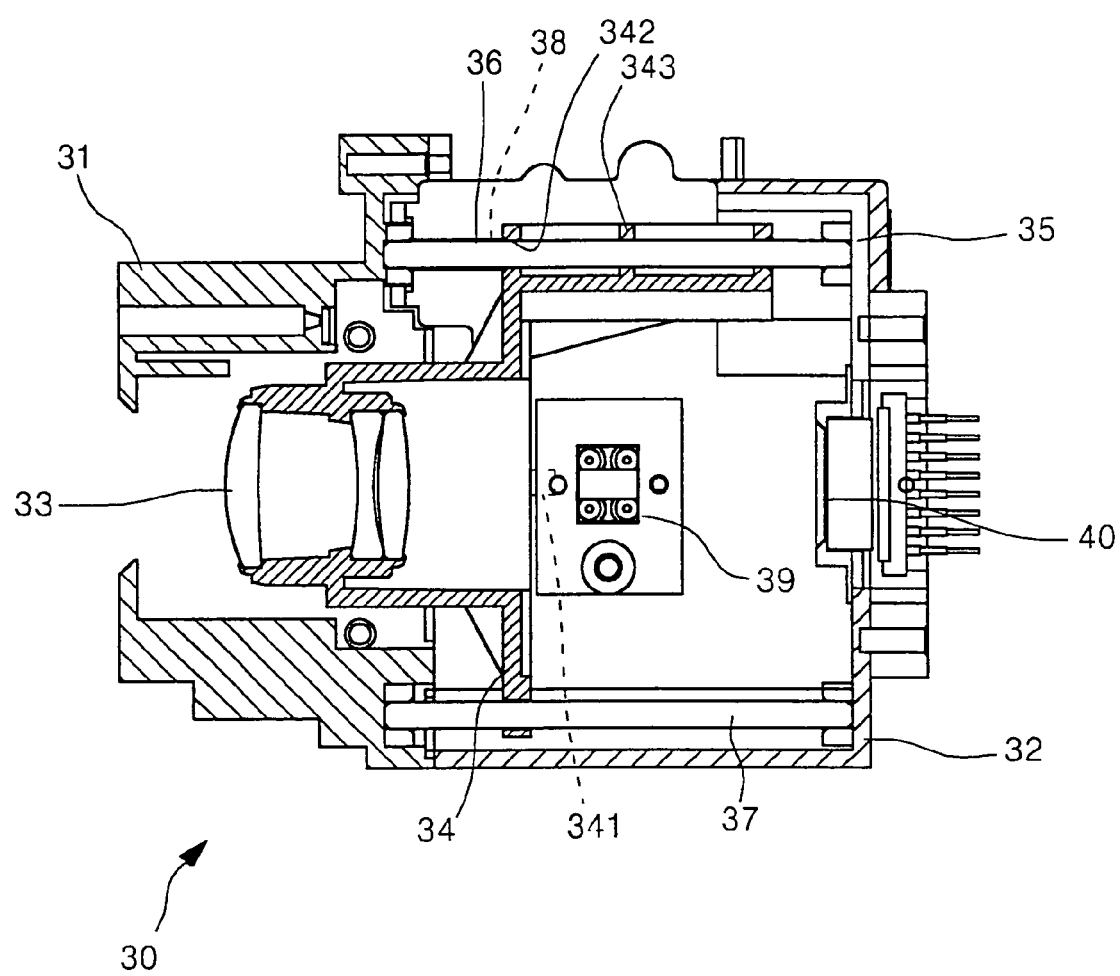
FIG. 2 is a schematic lateral sectional view of an iris recognition camera according to an embodiment of the invention.

FIG. 2 is a schematic lateral sectional view of an iris recognition camera according to an embodiment of the invention. As shown in the FIG. 2, an iris recognition camera 30 includes a front casing 31 and a rear casing 32 defining an outer case of the camera 30. The camera 30 further includes a refraction lens 33 configured to refract incident light, a driving barrel 34 configured to support and protect the refraction lens 33, and a motor 35 which is rotatable by means of an external power source (not shown) to reciprocatingly move the driving barrel 34. A lead screw 36 is provided at an outer circumference with a screw thread and is connected to an output end of the motor 35. A rack 342 is formed on the driving barrel 34 and is screw-coupled with the outer circumference of the lead screw 36 to reciprocatingly move by the rotation of the lead screw 36. Guide bars 37 and 38 are formed on opposite sides of the driving barrel 34 and allow the driving barrel 34 to be stably moved by supporting the driving barrel 34 as it reciprocates. The camera 30 further includes an image pickup device 40, such as a charged-coupled device (CCD), configured to convert light refracted by the lens 33 into an image.

Preferably, the refraction lens 33 comprises a wide-angle lens that is appropriate for capturing an image close to the user. In this embodiment, the lens has a focusing distance of about 11.8±1 mm, an image pickup distance range of about 20-70 cm, in a range of which the image pickup can be realized while the lens reciprocates, and an F number of about 4.6. However, other focusing distances, image pickup distance ranges, and F numbers may also be appropriate based on the particular use or application.

For example, an image pickup distance range of about 20-70 mm may be set so that the camera can be used for a personal computer, as well as for an iris recognition system. That is, conventional iris recognition cameras have an image pickup distance range of about 10-30 cm, while personal computer cameras have an image pickup distance of about 45 cm. Therefore, the image pickup distance range according to embodiments of the invention may be set to cover both image pickup distance ranges. Furthermore, in order for the camera to scan the iris image even when the user is remotely located, the image pickup distance range may be extended to 70 cm.

Figure 3:
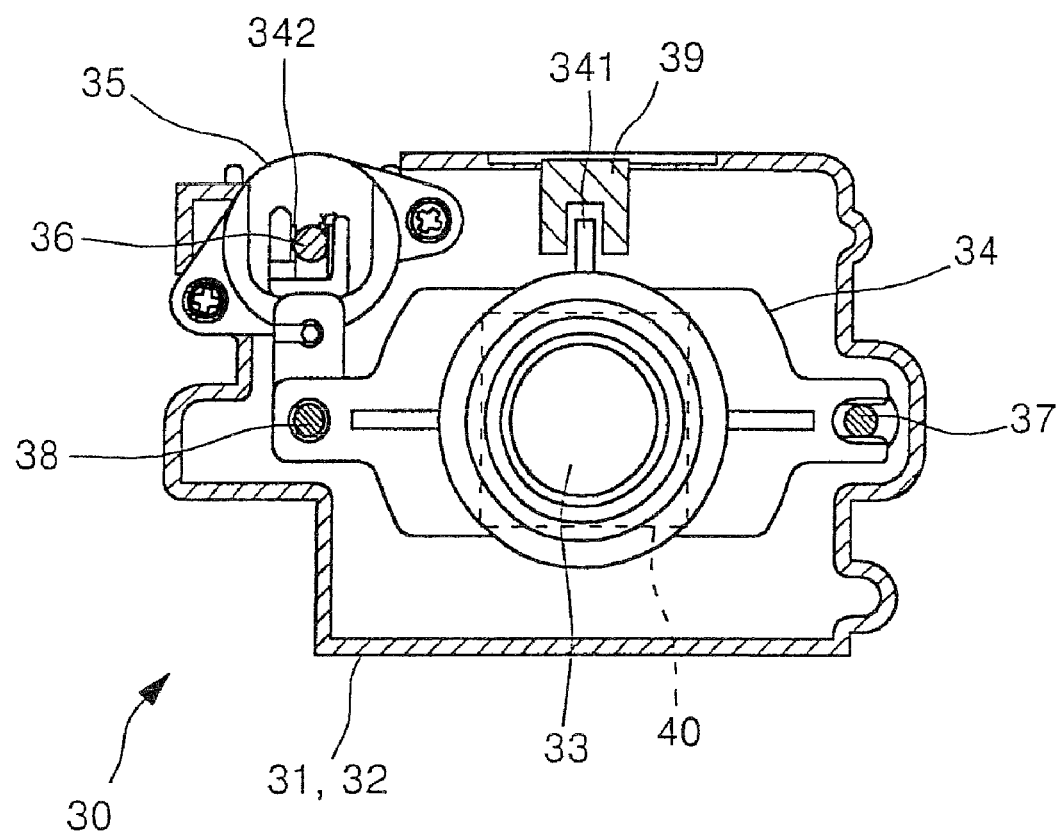
FIG. 3 is a schematic longitudinal sectional view of an iris recognition camera according to an embodiment of the invention.

As shown in FIG. 3, the first and second guide bars 37 and 38 are formed on left and right sides of the driving barrel 34, and portions of the driving barrel 34 are disposed around the first and second guide bars 37 and 38 to provide for stable reciprocal motion of the driving barrel 34. Above the second guide bar 38, the motor 35, the lead screw 36, and the rack 342 are disposed to reciprocate the driving barrel 34. The lens 33 is disposed on a central portion of the driving barrel 34, and the image pickup device 40 is formed on a central portion of the lens.

A position sensor 39 is formed on an inner, top surface of the camera body, which allows location information for the driving barrel 34 to be transmitted to the iris recognition system and the location of the lens 33 adjusted to focus the user's iris. That is, the position sensor 39 communicates with a detection portion 341 formed on a rear side of the driving barrel 34. The detecting portion 341 detects a location of the driving barrel 34 in accordance with an on/off signal from the position sensor 39. That is, the position sensor 39 is turned on/off by the detecting portion 341. The position sensor 39 may be, for example, an optical sensor that has both light reception and emission parts. In such a case, the on/off operation of the position sensor 39 is realized when the operation of the position sensor 39 is blocked by the detecting portion 341. However, the invention is not so limited. That is, a variety of sensors such as a contact sensor, a sound sensor, or other type sensor may also be used as the position sensor.

The rack 342 may be screw-coupled to the lead screw 36 in two or more places. A spring 343 configured to securely support the rack 342 may be further provided. Since the rack 342 is moved by the rotation of the lead screw 36, the displacement of the rack 342 can be stably realized.

Figure 4:
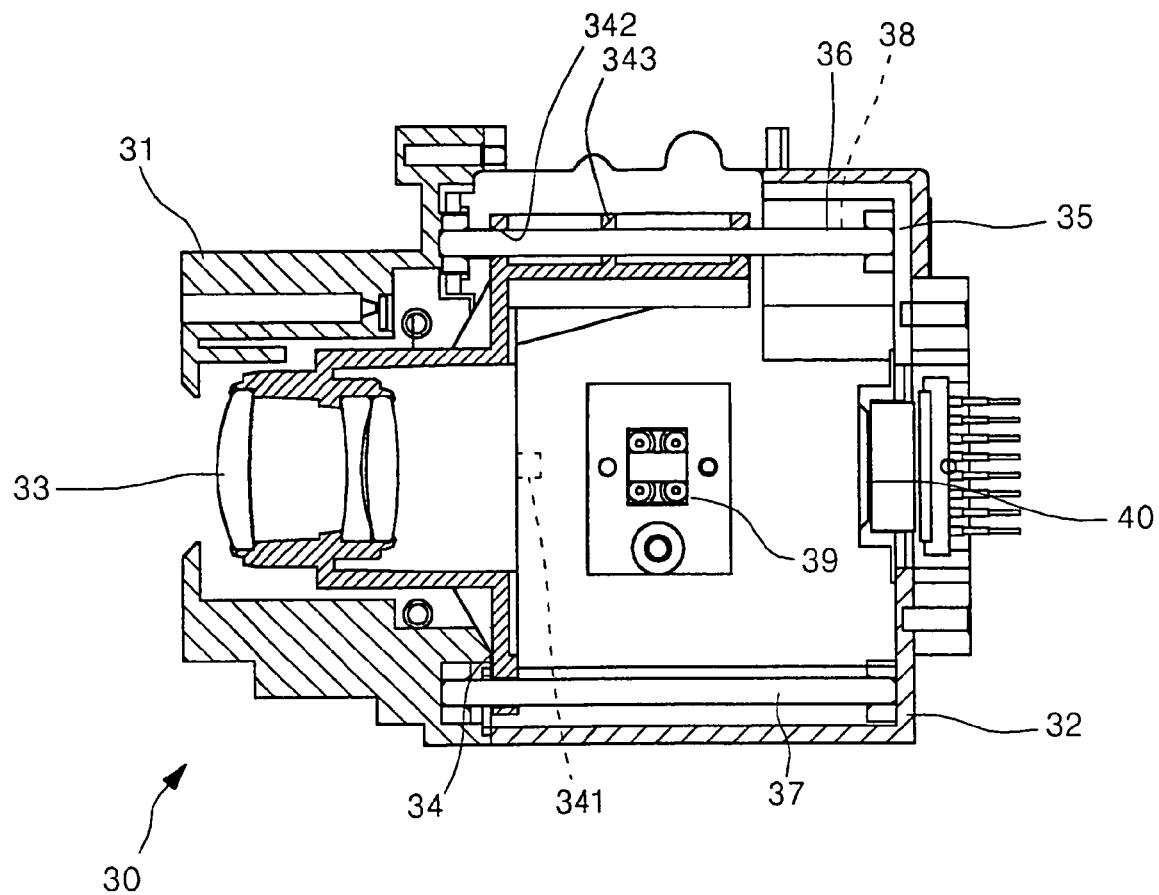
FIGS. 4 and 5 are schematic lateral sectional views illustrating a maximum reciprocal distance of a lens of an iris recognition camera according to an embodiment of the invention.
Figure 5:
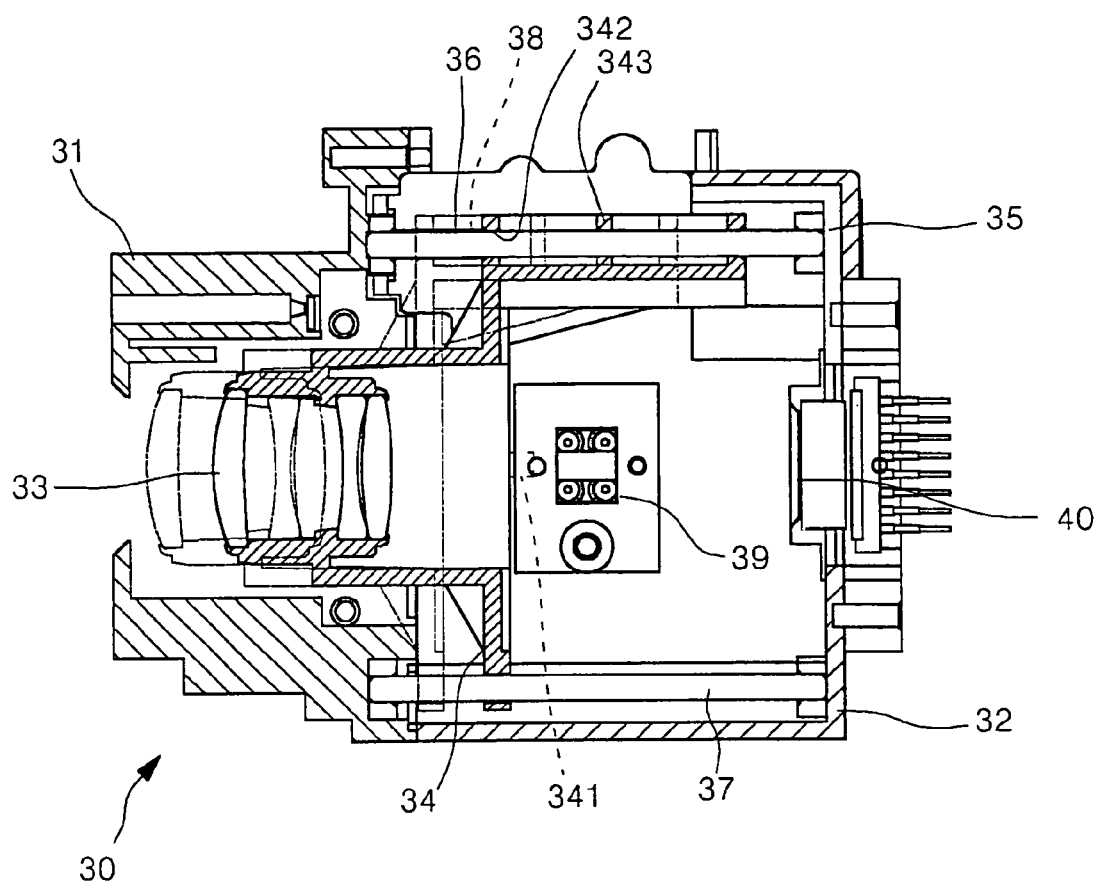

FIGS. 4 and 5 show a maximum reciprocal distance of a lens of the iris recognition camera discussed above.

FIG. 4 shows the lens 33 located at a foremost location, while FIG. 5 shows the lens 33 located at a rearmost location. As the lens 33 moves between the foremost and rearmost locations, the user's iris is focused.

More particularly, the position sensor 39 and the detecting portion 341 are designed such that they are mutually detected when the driving barrel 34 is displaced to the rearmost location to improve the user's convenience. In more detail, if the position sensor 39 is located in a moving trace of the driving barrel 34, the position sensor 39 may be erroneously turned on/off by other portions of the driving barrel 34. Therefore, the position sensor 39 is located at the driving barrel's rearmost location out of the moving trace of the driving barrel 34.

The above-described iris recognition camera generally operates as follows. When a user's approach to the camera is first detected, the iris recognition camera is driven by a controller of an iris recognition system. When the iris recognition camera 30 starts driving, the driving barrel 34 moves rearward until the detecting portion 341 is detected by the position sensor 39.

When the detecting portion 341 is detected by the position sensor 39, the movement of the driving barrel 34 is stopped. The location at which the detecting portion 341 is stopped by the position sensor 39 is pre-stored in a memory of the iris recognition system so that the location of the lens stopped by the driving barrel can be noted.

Meanwhile, when a current location of the user is noted, the motor 35 is driven to move the lens 33 to a location in which the user's iris image can be most properly captured. The driving force of the motor 35 is transmitted to a driving barrel 34 through the lead screw 36 and the rack 342, also displacing or moving the lens 33 positioned on a front side of the driving barrel 34.

Information regarding the displacement of the driving barrel 34, for example, by detecting an RPM or a rotational angle of the motor 35, is stored in the memory of the iris recognition system so that the location of the driving barrel 34 can be noted. In order to accurately note the location of the driving barrel, the motor 35 may comprise a step motor having an accurate rotational angle; however, other type motors may also be appropriate.

When the lens 33 is moved to a predetermined focusing location, the operation of the motor 35 is stopped, and the image pickup device 40 captures the image of the iris and transmits the captured image to the iris recognition system, after which the operation of the camera is stopped.

Meanwhile, an iris of the camera is operated just before the operation of the image pickup device 40 so that an appropriate amount of light is received. However, since the lens displacement is realized by evaluation of the location of the wide-angle lens, which can realize a clear image in response to the location of the user without performing independent focusing and zoom in/out operations, the user's iris image can be quickly captured. Further, when there is a need to adjust a focusing distance, a reprocess for image pickup can be further performed.

The above-described operation occurs only when electric power is initially applied to the iris recognition system to initially operate the camera. However, when the iris recognition system is continuously operated, that is, when the electric power is in an on-state, the lens location information for the image pickup of a former user is stored in the memory. Then, a difference between the lens location for the former user and an image pickup location of the current user may be calculated so that the image pickup of the current user's iris is realized after the lens is displaced by only the calculated difference. The displacement information of the lens for the current user is updated and stored as former image pickup location information so that it can be compared with an image pickup location of another user, and the lens can be displaced by the location difference. The above-described processes are identically repeated for the next iris image pickup operation.

By the above-described operation of the inventive iris recognition camera, the iris image pickup operation can be more quickly realized.

A method for operating the iris recognition camera according to an embodiment of the invention is discussed in detail below with reference to the flow chart of FIG. 6.

Figure 6:
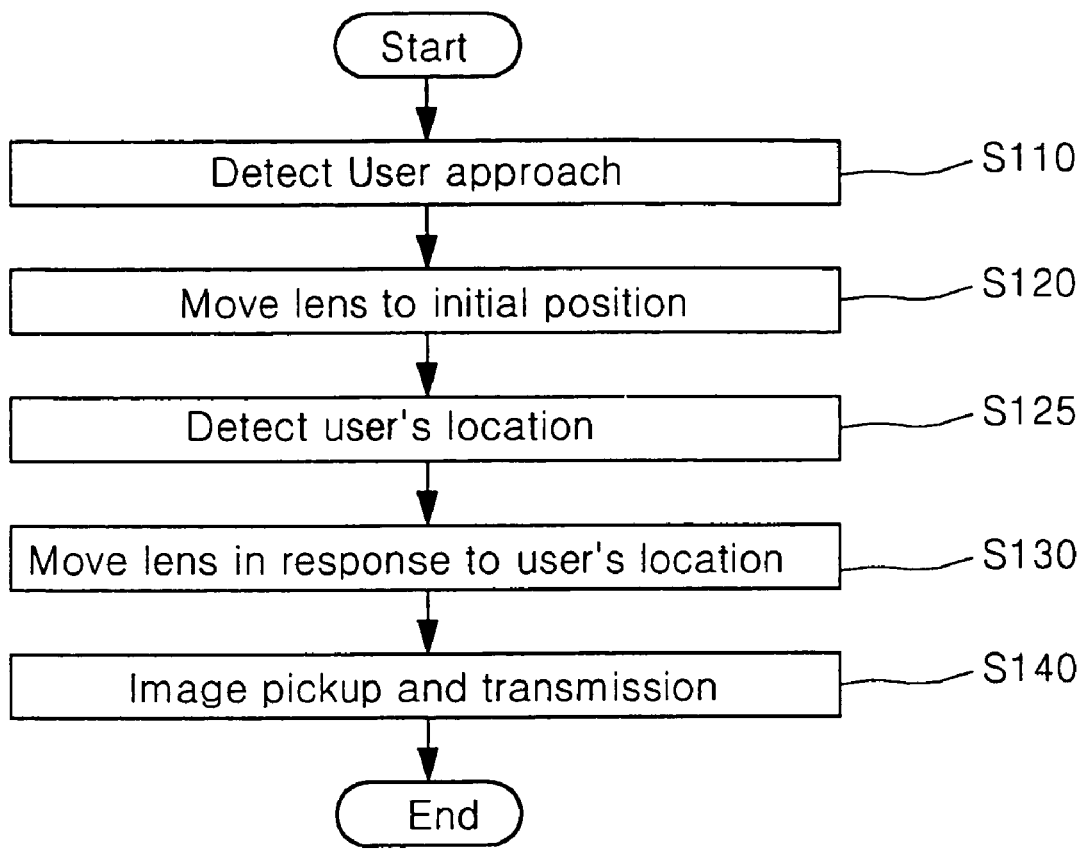
FIG. 6 is a flowchart illustrating a method of operating an iris recognition camera according to an embodiment of the invention.

As shown in FIG. 6, when a user moves into an iris recognition range, the user is detected by a sensor, in step S110. Then, the iris recognition camera is moved to an initial position by the iris recognition system, in step S120. That is, the iris recognition camera is moved rearward until the movement of the driving barrel is stopped by the detection of the position sensor. In addition to the movement of the lens to the initial position, the user's location is detected by a distance measuring device of the iris recognition system, in step S125. Then, the motor is rotated to move the lens to an appropriate location for the image pickup of the user's iris, in step S130. When the lens is located at the appropriate location, the user's iris image is captured by the image pickup device and transmitted to a frame graver of the iris recognition system, in step S140, thereby finalizing the operation of the iris recognition camera.

As described above, it is only necessary to move the lens to a proper location for the user. In other words, since the camera is moved to an appropriate location by one operation after the single lens is moved to the initial position, the operation time of the camera can be reduced in comparison to prior art devices.

Figure 7:
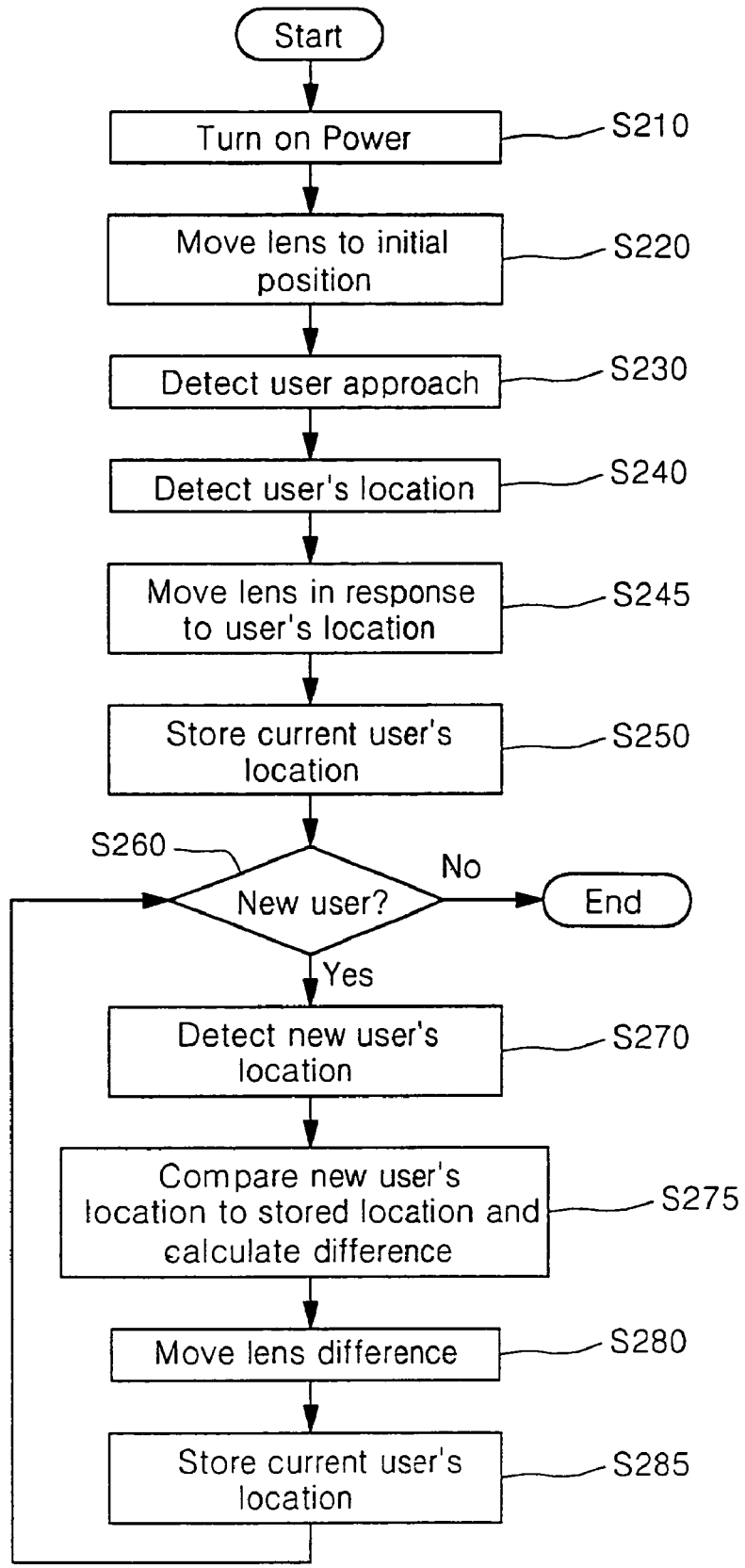
FIG. 7 is a flowchart of a method of operating an iris recognition camera according to another embodiment of the invention.

FIG. 7 shows a flowchart illustrating a method for operating an iris recognition camera according to another embodiment of the invention.

In the method of FIG. 7, the specific location of the lens is noted only when the power of the iris recognition system is turned on. However, when the iris recognition system keeps operating, a difference between the former location of the lens and the current location, which is proper to capture the image of a current user's iris, is calculated so that the lens is displaced only by the difference.

In more detail, when the iris recognition system is turned on, in step S210, the driving barrel is moved rearward to an initial position when it is detected by the position sensor, in step S220. When the driving barrel is stopped, the stopped location is set and used in the iris recognition system as a reference location for the initial positions of the driving barrel and lens.

Next, it is detected that a user approaches, in step S230. Then, the user's location is detected, in step S240, and the lens is moved to a location in which the user's iris image can be clearly focused and the image pickup performed, in step S245.

After the image pickup is performed as described above, the current lens location at which the image pickup is performed is stored in a memory, in step S250. The current lens location is determined by a RPM of the motor. Since the RPM of the motor can be accurately converted into a reciprocal distance of movement of the lens by the mutual operation of the rack and the lead screw, the lens location can be reliably obtained.

In step S260, it is detected if a new user approaches the iris recognition system. When it is determined that a new user approaches the iris recognition system, the new user's location, which is appropriate for the image pickup of the current user, is detected, in step S270. Then, in step S275, the new user's lens location is compared with the stored lens location. Next, in step S280, the lens is moved by the calculated difference, and in step S285, the new user's location is stored. The process then returns to step S260. If it is detected that there is no user to be scanned in step S240, the process is ended.

The present invention provides at least the following advantages.

The invention provides an iris recognition camera having a simple structure that can accurately recognize the iris of a user. Further, the invention provides an iris camera that can save manufacturing costs due to its simplified structure. Furthermore, the invention provides an iris recognition camera that can quickly recognize an iris image in a state in which a user remains stationary. Also, since an inexpensive wide-angle lens is used, the manufacturing costs of the iris recognition system can be reduced with respect to prior art devices.

Also, as described above, the time for moving the lens to a location appropriate for the user's iris image pickup can be reduced with respect to prior art devices. That is, there is no need for focus and zoom in/out operations of the lens. When a user approaches to within a predetermined range in which the wide-angle lens performs the image pickup, the single wide-angle lens moves to a location appropriate for the image pickup and captures the iris image. Further, after the first user, there is no need to again move the lens to the initial position, and thus the moving time of the lens can be further reduced. Furthermore, as the lens's moving time is reduced, the operation time of the camera for identifying a user can be reduced.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An iris recognition camera, comprising:
    a driving barrel configured to support a single alignment of at least two lenses configured to serve as a wide-angle lens at all times, wherein the at least two lenses are respectively fixed to a predetermined position of the driving barrel so that intervals between all lenses in the single alignment of the at least two lenses are immutable;
    a moving device comprising a single drive motor configured to reciprocatingly move the driving barrel to perform both focus and zoom operations at the same time; and
    a position sensor attached to a casing of the iris recognition camera that is configured to detect a position of the driving barrel within the camera and configured to detect a user of the iris recognition camera.

2. The iris recognition camera according to claim 1, wherein the moving device comprises:
    the single drive motor;
    a lead screw connected to the motor at one end; and
    a rack coupled to an outer circumference of the lead screw.

3. The iris recognition camera according to claim 2, wherein the drive motor comprises a step motor.

4. The iris recognition camera according to claim 1, wherein the driving barrel is provided at one side with a detecting portion configured to communicate with the position sensor so that the position sensor detects a position of the driving barrel.

5. The iris recognition camera according to claim 1, wherein the single alignment of the at least two lenses has a focusing distance of 11.8.+−.0.1 mm.

6. The iris recognition camera according to claim 1, further comprising one or more guide bars configured to guide the driving barrel during reciprocating movement.

7. The iris recognition camera according to claim 6, wherein the one or more guide bars comprises a pair of guide bars, respectively, positioned on opposite sides of the driving barrel.

8. The iris recognition camera according to claim 1, wherein the position sensor is positioned behind the at least two lenses.

9. The iris recognition camera according to claim 1, wherein the single alignment of the at least two lenses has an image pickup distance range of 20-70 cm.

10. The iris recognition camera according to claim 1, wherein the position sensor comprises one of an optical sensor or a contact sensor.

11. An iris recognition system comprising the iris recognition camera of claim 1.

12. A method of operation for an iris recognition camera, comprising:
    detecting a user;
    moving via a moving device comprising a single drive motor a camera lens of the iris recognition camera to an initial position detected by a position sensor, that is attached to a casing of the iris recognition camera, after the position sensor detects the user;
    thereafter reciprocatingly moving via the moving device comprising the single drive motor the camera lens to perform both focus and zoom operations from the initial position to an image pickup location where a user's iris can be captured, wherein the camera lens includes at least two lenses which are fixed respectively to a predetermined position of a driving barrel so that intervals of all lenses of the at least two lenses are immutable; and
    performing the image pickup using an image pickup device.

13. The method according to claim 12, wherein the image pickup device comprises a charge-coupled device.

14. The method according to claim 12, wherein the driving motor comprises a step motor.

15. The method according to claim 12, wherein the iris recognition camera further comprises a power transmission configured to transmit power for moving the camera lens.

16. The method according to claim 15, wherein the power transmission device includes a lead screw configured to be rotated by power from the drive motor, and rack screw-coupled to an outer circumference of lead screw.

* * * * *